(12) United States Patent
Haertel et al.

(10) Patent No.: US 12,521,864 B2
(45) Date of Patent: Jan. 13, 2026

(54) WORK APPARATUS

(71) Applicant: Andreas Stihl AG & Co. KG, Waiblingen (DE)

(72) Inventors: Alexander Haertel, Ludwigsburg (DE); Fabian Willems, Stuttgart (DE); Gregor Pfister, Waiblingen (DE); Benjamin Barth, Rosengarten (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 18/602,777

(22) Filed: Mar. 12, 2024

(65) Prior Publication Data

US 2024/0308049 A1    Sep. 19, 2024

(30) Foreign Application Priority Data

Mar. 14, 2023  (DE) ................... 10 2023 106 280.6

(51) Int. Cl.
*B25F 5/02* (2006.01)
*B23D 45/16* (2006.01)
*B23Q 11/08* (2006.01)

(52) U.S. Cl.
CPC ............... *B25F 5/02* (2013.01); *B23Q 11/08* (2013.01); *B23D 45/16* (2013.01)

(58) Field of Classification Search
CPC ............ B25F 5/02; B23Q 11/08; B23D 45/16
See application file for complete search history.

(56) References Cited

U.S. PATENT DOCUMENTS

| 4,103,460 A * | 8/1978 | Law .................. B24B 55/00 |
| | | 451/295 |
| 4,558,539 A * | 12/1985 | Hansson ............ B24B 55/052 |
| | | 451/295 |
| 4,683,682 A | 8/1987 | Pennison |

(Continued)

FOREIGN PATENT DOCUMENTS

| DE | 31 35 820 A1 | 3/1983 |
| DE | 103 48 395 A1 | 5/2005 |

(Continued)

OTHER PUBLICATIONS

Search report of the British Intellectual Property Office dated Aug. 21, 2024 for corresponding British patent application GB2403199.9.

*Primary Examiner* — Lucas E. A. Palmer
(74) *Attorney, Agent, or Firm* — Walter Ottesen, P.A.

(57) ABSTRACT

A work apparatus has a tool, which can be driven in a rotating manner around a rotational axis. The work apparatus has a protective hood extending over at least a part of the periphery of the tool. The protective hood is attached to a housing part of the work apparatus. At least two rotation locks for the protective hood are arranged in different angular positions around the rotational axis. Each rotation lock is formed by virtue of the fact that one of the components of the protective hood and the housing part has a protruding section cooperating with a section of the other component of the protective hood and the housing part and securing the protective hood on the housing part in a positive-locking manner against rotation around the rotational axis, so that the protective hood is prevented from moving with respect to the housing part around the rotational axis.

15 Claims, 7 Drawing Sheets

(56)  References Cited

U.S. PATENT DOCUMENTS

| | | | | |
|---|---|---|---|---|
| 5,862,594 | A * | 1/1999 | Soderqvist | B24B 55/052 30/391 |
| 6,949,017 | B2 * | 9/2005 | Koschel | B24B 23/02 451/451 |
| 9,221,111 | B2 * | 12/2015 | Elfner | B24B 27/08 |
| 10,307,886 | B2 * | 6/2019 | Arthur | B27G 19/04 |
| 10,427,263 | B2 * | 10/2019 | Nakaganna | B23D 45/16 |
| 10,434,586 | B2 * | 10/2019 | Geromiller | B23D 45/16 |
| 2006/0286910 | A1 * | 12/2006 | Voigt | B24B 55/052 451/359 |
| 2010/0178857 | A1 | 7/2010 | Esenwein | |
| 2010/0248599 | A1 | 9/2010 | Voigt et al. | |
| 2015/0038064 | A1 | 2/2015 | Elfner et al. | |
| 2016/0297052 | A1 * | 10/2016 | Aiken | B24B 23/028 |
| 2017/0225316 | A1 | 8/2017 | Iwakami et al. | |
| 2018/0236634 | A1 * | 8/2018 | Chen | B24B 55/052 |
| 2018/0281086 | A1 * | 10/2018 | Greitmann | B25F 5/021 |
| 2018/0319004 | A1 * | 11/2018 | Strömbäck | B23D 45/16 |
| 2020/0114490 | A1 * | 4/2020 | Andrasic | B27G 21/00 |
| 2021/0053186 | A1 * | 2/2021 | Kuo | B25F 5/02 |
| 2024/0198482 | A1 * | 6/2024 | Bowers | B27G 19/04 |

FOREIGN PATENT DOCUMENTS

| | | |
|---|---|---|
| DE | 20 2004 014 609 U1 | 2/2006 |
| DE | 10 2005 000 085 A1 | 1/2007 |
| DE | 10 2007 052 684 A1 | 5/2009 |
| DE | 10 2013 012 746 A1 | 2/2015 |
| DE | 10 2017 101 992 A1 | 8/2017 |
| EP | 0 130 168 A1 | 1/1985 |
| EP | 3 556 512 A1 | 10/2019 |
| GB | 2 450 990 A | 1/2009 |

* cited by examiner

Fig. 15

WORK APPARATUS

CROSS-REFERENCE TO RELATED APPLICATIONS

This application claims priority of German patent application no. 10 2023 106 280.8, filed Mar. 14, 2023, the entire content of which is incorporated herein by reference.

BACKGROUND

DE 103 48 395 A1 discloses an electric machine tool which has a protective hood. The electric machine tool has a stop which delimits the rotational movement of the protective hood with respect to a housing of the electric machine tool. Until it reaches the stop, the protective hood can rotate with respect to the housing over a comparatively large angular range with respect to the housing.

SUMMARY

It is an object of the disclosure to propose a work apparatus which is constructed in a simple manner and which even in the case of high forces acting on the protective hood renders it possible for the protective hood to be adequately secured against rotation.

This object is, for example, achieved by a work apparatus including: a tool configured to be driven in a rotating manner around a rotational axis; a protective hood extending over at least a part of a periphery of the tool; the protective hood being attached to a housing part of the work apparatus; at least two rotation locks for the protective hood which are arranged in different angular positions around the rotational axis; a first one of the protective hood and the housing part being a first component; a second one of the protective hood and the housing part being a second component, wherein the first component differs from the second component; and, the first component having a protruding section which cooperates with a section of the second component and secures the protective hood on the housing part in a positive-locking manner against rotation around the rotational axis, so that the protective hood is prevented from moving with respect to the housing part around the rotational axis.

It is provided that the work apparatus has at least two rotation locks for the protective hood which are arranged in different angular positions around the rotational axis. Each rotation lock is formed by virtue of the fact that one of the components of the protective hood and the housing part has a protruding section which cooperates with a section of the other component of the protective hood and the housing part. The rotation locks secure the protective hood on the housing part in a positive-locking manner against rotation around the rotational axis. Each rotation lock prevents the protective hood moving with respect to the housing part around the rotational axis. In so doing, the protective hood is prevented from rotating with respect to the housing part within the usual component tolerances. Only small relative movements which arise due to component tolerances of the protective hood and the housing part can be possible. The relative movements, that is, the rotational movement of one component with respect to the other around the rotational axis, which are possible due to component tolerances of the protective hood and the housing part, are advantageously less than 5°, in particular less than 3° around the rotational axis. The protective hood is secured to the housing part against rotation within the manufacturing tolerances. The protective hood is not rotatably mounted on the housing part.

The protective hood is attached to the housing part in a position which is constructively predetermined within the manufacturing tolerances. There is no provision for the operator to rotate the protective hood to enable different positions of an engagement area of the tool. Each rotation lock advantageously prevents the protective hood rotating with respect to the housing part in both rotational directions around the rotational axis.

The work apparatus is a work apparatus in the case of which the operator is not intended to rotate the protective hood with respect to the housing part. Until now, it has been common practice to screw the protective hood to the housing part of such work apparatuses. In this case, the rotation lock acts by virtue of the at least one screw connection. Screw connections are non-positive locking connections.

According to the disclosure, at least two rotation locks are now provided in different angular positions around the rotational axis, which positively secure the protective hood on the housing part against rotation around the rotational axis. Securing the protective hood in a positive-locking manner by means of at least two anti-rotation locks renders possible a simple configuration in which the protective hood is prevented from rotating with respect to the housing part even in the case of very high forces acting on the protective hood. This results in a simple and stable construction. In addition, one or more non-positive locking connections can be provided between the protective hood and the housing part.

The angular position of a rotation lock around the rotational axis refers to the angle which the line connecting the rotational axis and a central axis of the rotation lock includes with a reference line that runs through the rotational axis. The angular position is measured in this case in an intersection plane that extends perpendicular to the rotational axis. Different angular positions of two rotation locks around the rotational axis arise if the angle which the line connecting the rotational axis and the central axis of the respective rotation lock includes with a reference line for the rotation locks has a different value for the two rotation locks. The angular position is determined in this case for all rotation locks in relation to the same reference line.

The rotation lock is itself advantageously formed by the protective hood and the housing part and not by additional, separate elements which are connected to a base body of the protective hood or a base body of the housing part. As a consequence, a simple construction is achieved. At the same time, the rotation locks can be configured in a simple manner to be sufficiently stable. It is particularly preferred that the protruding section of one component and/or the section of the other component are configured as one piece with a base body of the protective hood and/or housing part. In an advantageous manner, the protruding section of one component and/or the section of the other component are molded onto a metal casting and produced in the same material as the casting.

In an advantageous manner, the protective hood is attached to the housing part of the work apparatus by way of at least one fastening element. The protruding section of one component engages advantageously in a receptacle of the other component. The fastening element protrudes advantageously into the protruding section. The protruding section is advantageously a section which forms a receptacle for the fastening element. The protruding section has advantageously a dual function, namely both the function of receiving the fastening element and also the function of forming the rotation lock by engaging into the receptacle of the other component.

In a particularly advantageous configuration, one of the components of the protective hood and the housing part has at least one screw boss which forms the protruding section, and the fastening element is a fastening screw that is screwed into the screw boss. The screw boss can be configured both to cooperate with its outer periphery in the case of a positive-locking rotation lock and also with a thread that is formed in the interior of the screw boss in the case of a non-positive locking connection of the protective hood and the housing part. This results in a simple and stable construction.

A maximum distance of 2 mm is advantageously formed between the protruding section of one component of the protective hood and the housing part and the section of the other component of the protective hood and the housing part. In this case, the distance is in a plane perpendicular to the rotational axis and measured in the peripheral direction to the rotational axis. By way of example in the radial direction in relation to the rotational axis, a greater distance is formed between the sections, since only the distance in the peripheral direction is relative for the rotation lock. The distance is advantageously configured so that possible relative movements of the protective hood and the housing part are less than 5°, in particular less than 3° around the rotational axis.

Advantageously, a first edge is formed on the protective hood and a second edge is formed on the housing part. The first edge and the second edge engage advantageously in each other and thereby secure the protective hood in a positive-locking manner against rotation around the rotational axis on the housing part. It is advantageously provided that one edge engages over the other edge. Advantageously, the first edge and the second edge form a rotation lock which is provided in addition to at least one rotation lock that is formed by a fastening element.

Advantageously, at least one edge is non-circular. It is particularly preferred that at least one edge has an oval shape. In an advantageous embodiment, both edges are non-circular, in particular oval. In an alternative embodiment, it is possible to provide that the at least one edge, in particular both edges, are eccentric to the rotational axis.

Advantageously, at least one edge runs around the rotational axis. As a consequence, the at least one edge forms a protection against contamination in the area of the rotational axis. The edge advantageously has no interruptions. It is preferred that both edges run around the rotational axis. Advantageously, at least one edge, in particular both edges, runs/run around all fastening elements. As a consequence, the fastening elements are protected by the at least one edge, in particular by both edges, against contamination.

Advantageously, a maximum distance of 2 mm is formed between the first edge and the second edge. In this case, the distance is measured perpendicular to the rotation lock. The edges advantageously form a rotation lock. The rotation locks formed by the protruding sections and the rotation lock formed by the edges enable at the most a very small rotation of the protective hood and the housing part. The minimal rotation which the rotation locks allow are advantageously of the same order of magnitude for all rotation locks.

Advantageously, the first edge engages over the second edge.

Advantageously, at least one protruding section is formed by an elevation on an edge and the elevation engages in a depression of the other edge and forms therewith at least one rotation lock. Advantageously, a plurality of elevations is formed on at least one of the edges and the elevations engage in depressions of the other edge. Advantageously each elevation together with each depression forms a rotation lock on its side walls. Particularly advantageously, a plurality of elevations are provided on the first edge and the elevations in each case engage in a depression of the second edge and/or a plurality of elevations are provided on the second edge and the elevations in each case engage in a depression on the first edge. In the case of an embodiment in which the first edge engages over the second edge on its outer side, it is advantageously provided that elevations on the first edge protrude in the direction towards the rotational axis and elevations on the second edge protrude away from the rotational axis. Particularly advantageously, the elevations and depressions of the two edges form a meshing arrangement.

Advantageously, at least one elevation and/or at least one depression of the first edge and/or of the second edge has a side wall which is at a distance of less than 2 mm from an associated side wall of the other edge. In this case, the distance can also be 0 mm so that the side walls abut against each other.

Advantageously the elevations and depressions form rotation locks which secure the protective hood with respect to the housing part against rotation in both rotational directions. The rotation locks prevent the protective hood moving with respect to the housing part around the rotational axis. By preventing the movement of the protective hood with respect to the housing part around the rotational axis it means in the present case that the protective hood can be rotated over an angle of less than 5°, in particular less than 3° and it is prevented from rotating over a larger angle in both rotational directions by each rotation lock.

In an advantageous embodiment variant, the at least one protruding section is arranged on the protective hood. It is preferred that a plurality of protruding sections is provided. The plurality of protruding sections is advantageously connected to one another by way of ribs. The protruding sections advantageously protrude beyond the free ends of the ribs. The extent to which the protruding sections advantageously protrude towards the free ends of the ribs is measured parallel to the rotational axis. The protrusion can advantageously be at least 1.5 mm. Advantageously, the protrusion is 1.5 mm to 5 mm. In an alternative configuration, the protruding sections can also be flush with the ribs and not protrude beyond the ribs.

Advantageously, a head of the at least one fastening element rests on an overlay that protrudes above a base of the housing part. This makes it easy to achieve a sufficient length of the fastening element and a defined contact surface of the head of the fastening element. A sufficient length of the fastening element is particularly important if the fastening element is a screw. If the fastening element is a screw, a particularly advantageous configuration is that the screw is screwed into a thread formed in the protective hood. In a preferred configuration, the thread can be formed in a screw boss that forms a protruding section. However, a configuration in which the protruding section is formed separately from the screw boss can also be advantageous.

Advantageously, the protective hood is attached to the housing part by way of at least one first fastening element and at least one second fastening element. The first fastening element and the second fastening element are advantageously at different distances from the rotational axis. This allows a fastening element to be arranged at a greater distance from the rotational axis in an area where sufficient installation space is available. Due to the greater distance from the rotational axis, greater torques can be transmitted around the rotational axis by way of this fastening element or the fastening element can be configured smaller. This enables an advantageous, compact and stable construction of the work apparatus.

Advantageously, the work apparatus is a cut-off machine having a drive motor and the housing part of the work apparatus, to which the protective hood is attached, is an outrigger of the cut-off machine.

The outrigger advantageously has a longitudinal central axis. The outrigger advantageously has a free end. The free end is the end of the outrigger lying remote from a housing of the work apparatus. A central axis of the first fastening element advantageously is at a first distance from the free end measured in the direction of the longitudinal central axis. The central axis of the second fastening element advantageously is at a second distance from the free end measured in the direction of the longitudinal central axis. The second distance is advantageously smaller than the first distance. A central axis of the second fastening element is advantageously arranged closer to the rotational axis than a central axis of the first fastening element. By virtue of the fact that the fastening element that is arranged closer to the free end of the outrigger is at a smaller distance from the rotational axis, it is possible for the tool to be submerged a comparatively greater depth into the workpiece. By virtue of the fact that the central axis of the first fastening element is arranged further away from the rotational axis, greater torques around the rotational axis can be absorbed by way of the second fastening element so that a greater stability of the arrangement is achieved.

Advantageously, at least three rotation locks are provided. The angular distance between two rotation locks that are adjacent in the peripheral direction around the rotational axis is advantageously not the same for all rotation locks that are adjacent in the peripheral direction around the rotational axis. If the angular distances between the adjacent rotation locks are determined for all rotation locks that are adjacent in the peripheral direction, different values arise for at least two angular distances. Advantageously, the angular distance between adjacent rotation locks, which are arranged close to the free end of the outrigger, is greater than from adjacent rotation locks, wherein at least one rotation lock is arranged further away from the free end of the outrigger. Also as a consequence, it is possible to achieve a comparatively great submersion depth of the tool into a workpiece at the free end of the outrigger.

Further advantageous embodiments are created by any combination of individual elements of the embodiments.

BRIEF DESCRIPTION OF DRAWINGS

The invention will now be described with reference to the drawings wherein.

DETAILED DESCRIPTION

Figure 1:
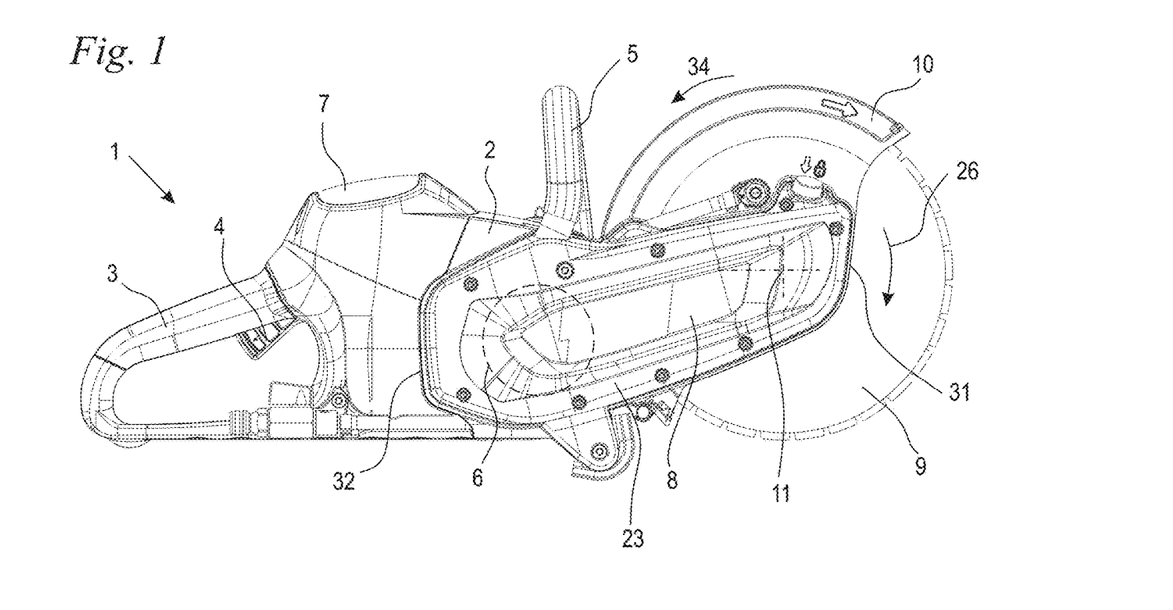
FIG. 1 shows a side view of a work apparatus.

FIG. 1 shows a cut-off machine as an embodiment for a work apparatus 1. The work apparatus 1 is a hand-guided, hand-held work apparatus 1. The work apparatus 1 is held and guided by the operator during the operation. The work apparatus 1 has a housing 2 on which are arranged a handle 3 and a bale handle 5 for guiding the work apparatus 1 during the operation. Other handles are also provided. A drive motor 6 is arranged in the housing 2. An operator controlled element 4 for activating the drive motor 6 is provided on the rear handle 3. In the embodiment, the drive motor 6 is an electric motor which is supplied with energy by a battery 7 that is contained in the housing 2. The drive motor 6 can also be configured as a combustion motor.

The work apparatus 1 includes an outrigger 8 in the embodiment. The outrigger 8 has a fastening end 32 and a free end 31. The ends 32 and 31 delimit the outrigger 8 in its longitudinal direction. The outrigger 8 is attached to the housing 2 in the area of its fastening end 32. The free end 31 is arranged remotely from the housing 2. A tool 9, in the embodiment a cut-off disk, is rotatably mounted on the outrigger 8 in the area of the free end 31. The tool 9 is mounted on the outrigger 8 in such a manner as to be able to rotate around a rotational axis 11. During the operation, the tool 9 is driven by the drive motor 6 in a rotating manner in a rotational direction 26 around the rotational axis 11. FIG. 1 also illustrates a rotational direction 34 which runs in the counter direction to the rotational direction 26.

A protective hood 10 is attached to the outrigger 8. The protective hood 10 covers the tool 9 over part of its periphery.

Figure 2:
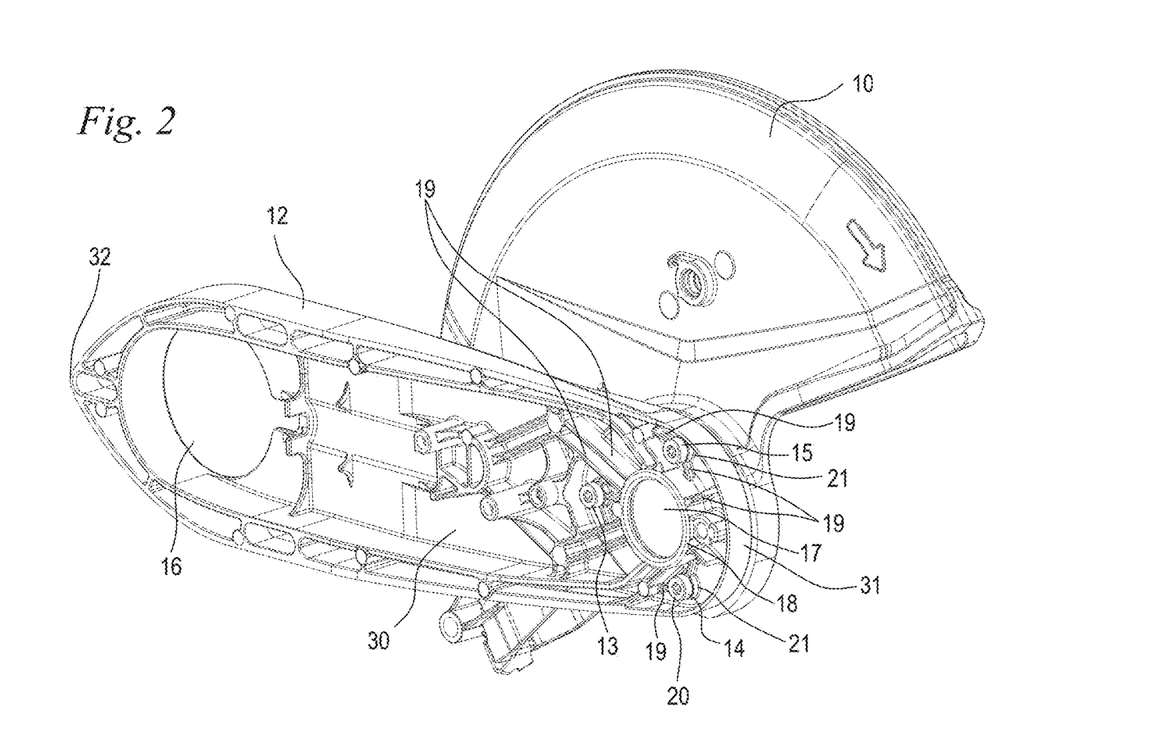
FIG. 2 shows a perspective view of a base body of an outrigger of a work apparatus with a protective hood arranged thereon.

In the embodiment the outrigger 8 is constructed from a base body 12 illustrated in FIG. 2 and a cover 23 illustrated in FIG. 1 and attached to the base body 12. A transmission device for transmitting the drive movement from the drive motor 6 to the tool 9 is advantageously arranged in the outrigger. The cover 23 is advantageously removable so that the transmission device is accessible for maintenance purposes. The transmission device can, for example, be a belt drive arranged in the outrigger 8. A different construction of the outrigger 8 can also be advantageous.

As FIG. 2 shows, the base body 12 has a drivetrain opening 16 which is adjacent to the fastening end 32 of the outrigger 8 and through which a means for transmitting the drive movement, for example a drive shaft of the drive motor 6, can protrude. Adjacent to the free end 31 of the outrigger 8, the base body 12 has an output opening 17 through which an output shaft can protrude and the tool 9 is attached to the output shaft. In the area of the output opening 17, the protective hood 10 is attached to the base body 12 of the outrigger 8. In the embodiment, fastening elements are provided for this purpose, namely a first fastening element 13, a second fastening element 14 and a third fastening element 15. In the embodiment example, the fastening elements 13 to 15 are configured as fastening screws. The fastening elements 13 to 15 protrude through the base body 12 of the outrigger 8 and are screwed into the protective hood 10. The fastening elements 13, 14, 15 can also be advantageously configured differently, for example as bolts, pins or the like.

The base body 12 includes a flat base 30, which has the drivetrain opening 16 and the output opening 17.

As FIG. 2 shows, the base body 12 has a hub 18 which encompasses the output opening 17. The hub 18 is configured as an edge that extends around the output opening 17 and protrudes into the interior of the outrigger 8. The hub 18 protrudes from the base 30.

In the embodiment, the base body 12 has a plurality of stiffening ribs 19. Some of the reinforcement ribs 19 extend from the hub 18. In the embodiment, the outrigger 8 has three elevations 21 and a head 20 of a fastening element 13 to 15 rests on each of the elevations. In the embodiment, reinforcing ribs 19 also extend from the elevations 21. The reinforcing ribs 19 and the elevations 21 protrude from the base 30.

Figure 3:
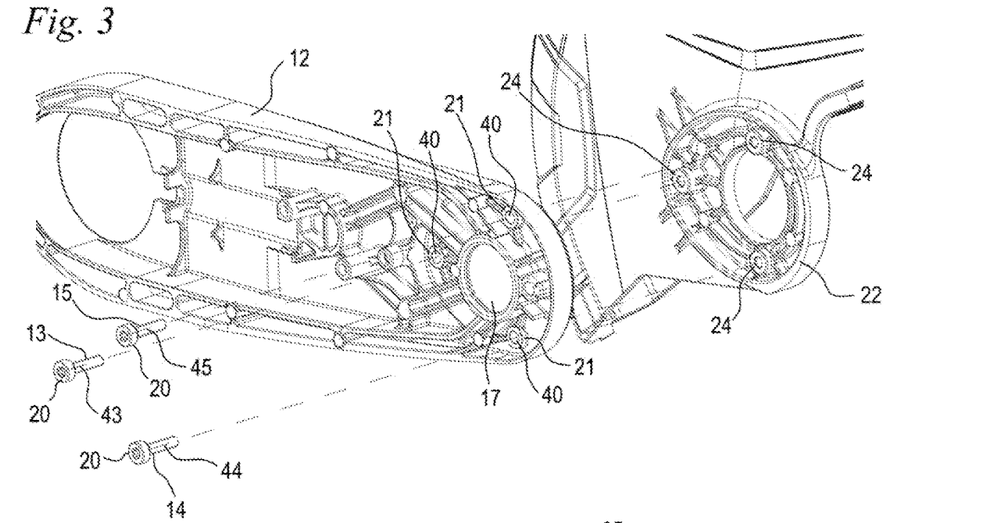
FIG. 3 shows a sectional exploded view of the arrangement shown in FIG. 2.

FIG. 3 shows an exploded view of the base body 12 of the outrigger 8 and the protective hood 10. As FIG. 3 shows, the elevations 21 each have a through opening 40 for the fastening elements 13 to 15. The protective hood 10 has three protruding sections 24 on the side facing the outrigger 8. The area in which the protruding sections 24 are arranged is encompassed by a first edge 22 that protrudes in the direction of the base body 12 of the outrigger 8. The first edge 22 runs around the area in which the protruding sections 24 are arranged. The first edge 22 advantageously has no interruptions.

Figure 6:
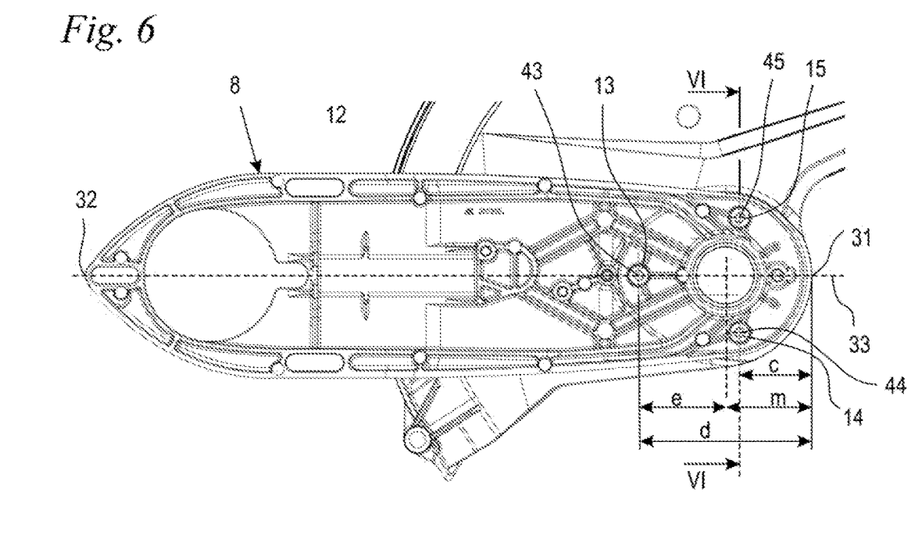
FIG. 6 shows a sectional side view of the arrangement shown in FIG. 2.

As FIG. 3 shows, the first fastening element 13 has a central axis 43. The second fastening element 14 has a central axis 44. The third fastening element 15 has a central axis 45. The central axes 43, 44 and 45 are also illustrated in FIG. 6.

Figure 4:
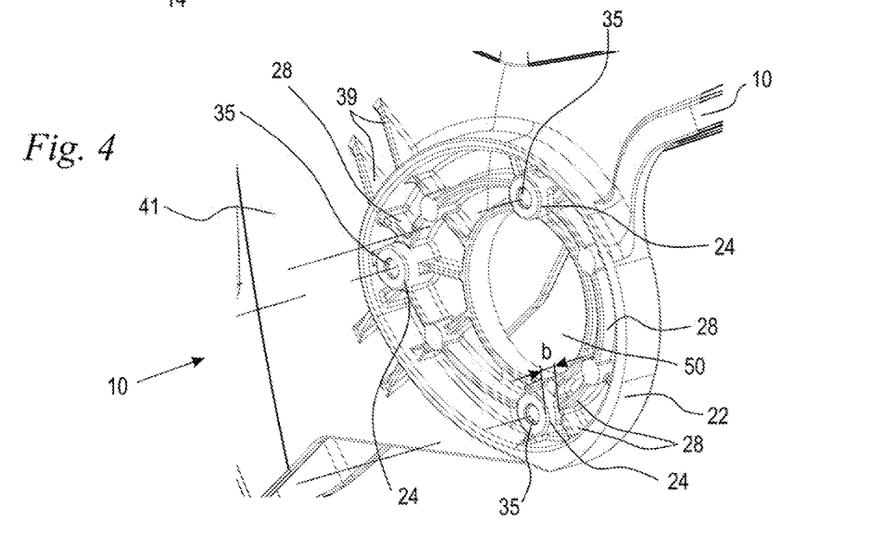
FIG. 4 shows an enlarged section of FIG. 3 in the area of the protective hood.

As FIG. 4 shows, the protruding sections 24 are each configured as a screw boss. The protruding sections 24 each have a thread opening 35. The fastening elements 13 to 15 (FIG. 3) are screwed into the thread openings 35. The protruding sections 24 are connected to one another by way of ribs 28. In the embodiment, some of the ribs 28 run around the output opening 17. An opening 50 is arranged in the protective hood. Ribs 28 that run around the output opening 50 connect the protruding sections 24. In addition, ribs 28 are provided which connect the protruding sections 24 to the edge of the opening 50 or the edge 22.

As FIG. 4 shows, the protruding sections 24 protrude beyond the end sides of the ribs 28. The protruding sections 24 protrude beyond the ribs 28 by a protrusion b. The protrusion b is advantageously 1.5 mm to 5 mm.

As FIG. 4 also shows, reinforcing ribs 39 are provided on the outer periphery of the first edge 22 and they protrude from the edge 22 to a side wall 41 of the protective hood 10. The side wall 41 defines an area of the protective hood 10 which partially covers a flat side of the tool 9.

Figure 5:
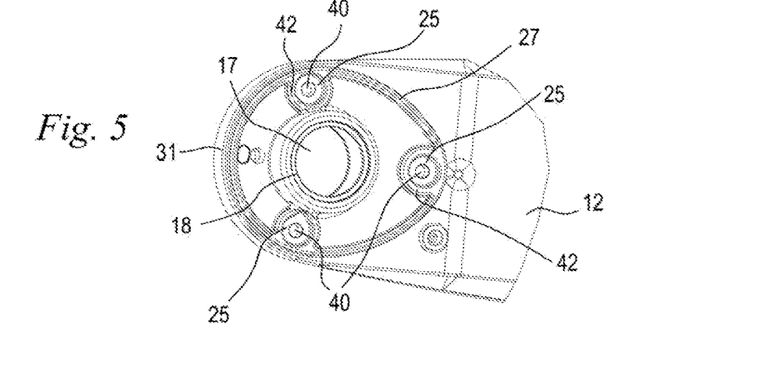
FIG. 5 shows a perspective view of the area of the free end of the outrigger shown in FIG. 2 from the side facing the protection hood.

FIG. 5 shows a section of the base body 12 of the outrigger 8 from the side facing the protective hood 10. As FIG. 5 shows, the hub 18, which encompasses the output opening 17, also extends to this side of the base body 12. As FIG. 5 also shows, each through opening 40 is encompassed by a receptacle 25. The receptacle 25 is configured in each case as a depression on the base body 12. The receptacles 25 are encompassed by a peripheral edge 42. The edge 42 transitions on the side remote from the output opening 17 into a second edge 27 which peripherally encompasses the area of the through openings 40 and the receptacles 25. The second edge 27 corresponds in its shape to the first edge 22 and is dimensioned such that the first edge 22 of the protective hood 10 can engage over the second edge 27 of the outrigger 8, as will be further explained below. An alternative configuration in which the second edge 27 engages over the first edge 22 can also be advantageous.

FIG. 6 shows the base body 12 in a side view when viewed in the direction parallel to the rotational axis 11. As FIG. 6 shows, the base body 12 of the outrigger 8 has a longitudinal central axis 33 which extends from the fastening end 32 to the free end 31. In the embodiment, the rotational axis 11 intersects the longitudinal central axis 33.

The central axis 43 of the first fastening element 13 is at a distance d from the free end 31. The distance d is measured along the longitudinal central axis 33 to the point at which the longitudinal central axis 33 intersects the free end 31. The central axis 43 of the first fastening element 13 is at a distance e from the rotational axis 11. The distance e is advantageously at least 30%, in particular at least 40% of the distance d. In the embodiment, the distance e is approx. 50% of the distance d.

The central axes 44 and 45 of the first fastening elements 14 and 15 are at a distance c from the free end 31. In the embodiment, the central axes 44 and 45 are at the same distance from the free end 31. However, different distances of the central axes 44 and 45 from the free end 31 can also be advantageous. The distance c is smaller than the distance d. The fastening elements 14 and 15 are arranged closer to the free end 31 in the direction of the longitudinal central axis 33 than the first fastening element 13.

The rotational axis 11 is at a distance m from the free end 31 measured along the longitudinal central axis 33. The distance c is smaller than the distance m of the rotational axis 11 from the free end 31.

All the distances c, d, e and m are measured along the longitudinal central axis 33 in the side view illustrated in FIG. 6 when viewed in the direction of the rotational axis 11.

Figure 7:
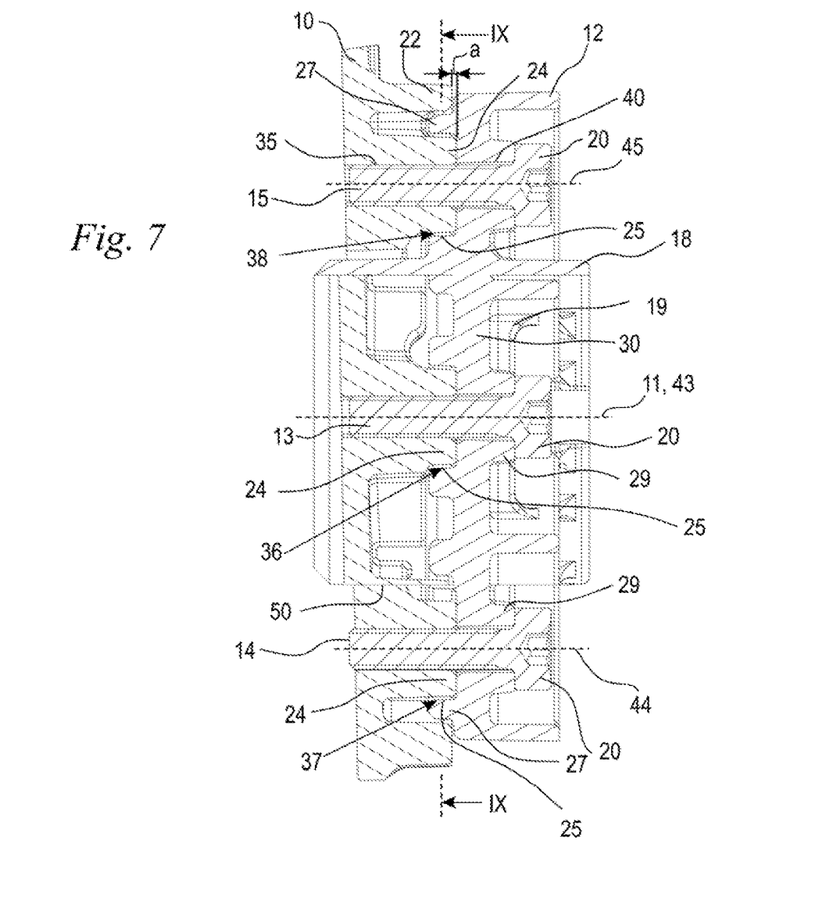
FIG. 7 shows a section along the line VII-VII shown in FIG. 6.

As FIG. 7 shows, the first edge 22 engages over the second edge 27 on its outer periphery. In the embodiment, the protruding section 24 protrudes beyond the first edge 22 by a distance a. In this case, the protrusion a is measured parallel to the rotational axis 11. The base body 12 of the outrigger 8 rests on the protruding sections 24 of the protective hood 10. FIG. 7 also illustrates how the fastening elements 13 to 15 protrude through the through openings 40 of the housing part 12 and are screwed into the thread openings 35 of the protective hood 10. In this case, the heads 20 of the fastening elements 13 to 15 rest in each case on an overlay 29 which protrudes from the base 30 of the base body 12. The overlays 29 protrude out of the base 30 on the side remote from the protective hood 10. The second edge 27 protrudes out of the base 30 on the side facing the protective hood 10.

As FIG. 7 shows, the protruding sections 24 protrude into receptacles 25 of the base body 12. Each protruding section 24 together with the associated receptacle 25 forms a rotation lock which secures the protective hood 10 on the outrigger 8 against rotation around the rotational axis 11. A first rotation lock 36 is formed in the area of the first fastening elements 13, a second rotation lock 37 is formed in the area of the second fastening element 14 and a third rotation lock 38 is formed in the area of the third fastening element 15. Each rotation lock 36, 37, 38 secures the protective hood 10 in a positive-locking manner against rotation around the rotational axis 11 so that the protective hood 10 is prevented from moving with respect to the base body 12 of the outrigger 8 around the rotational axis 11.

The elevations 21 extend starting from the base 30 and the overlays 29 are formed on the elevations. Furthermore, the reinforcing ribs 19 protrude from the base 30. The protruding sections 24 and the second edge 27 protrude from the base 30 on the side of the base 30 facing the protective hood 10.

Figure 8:
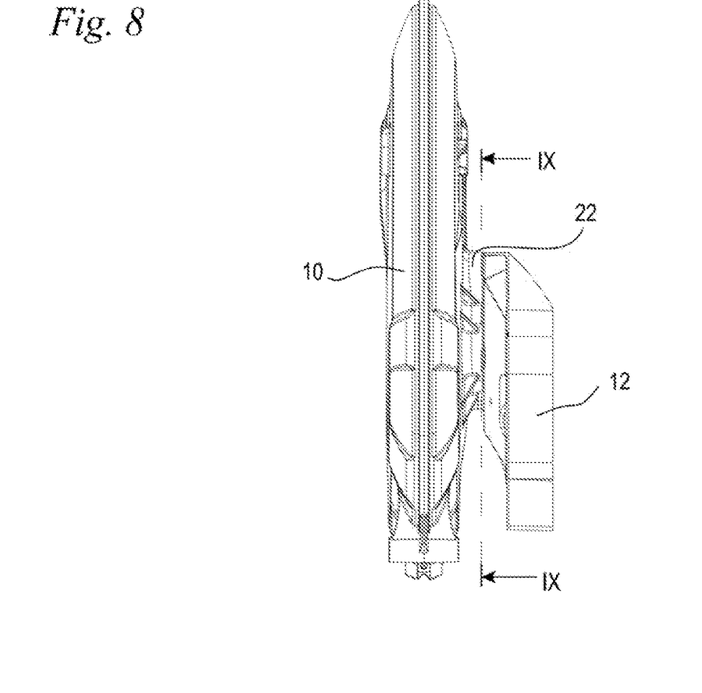
FIG. 8 shows a side view of the arrangement shown in FIG. 2.
Figure 9:
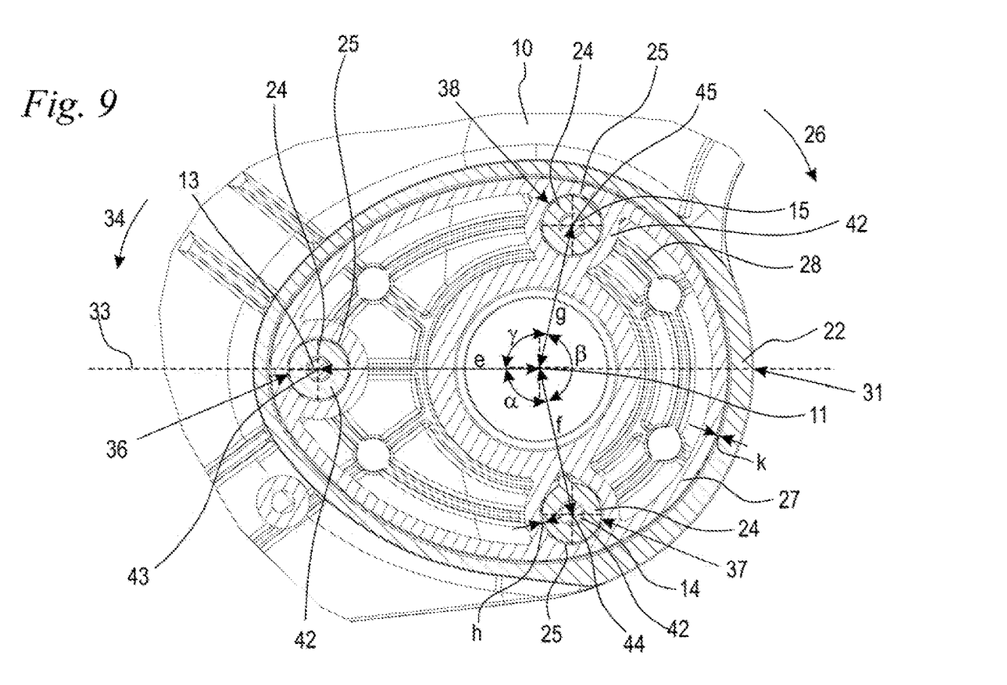
FIG. 9 shows a section along the line IX-IX shown in FIG. 8.

FIG. 9 shows a section along the line IX-IX in FIG. 8 in the area of the connection of the protective hood 10 to the base body 12 of the outrigger 8. FIG. 9 shows a section perpendicular to the rotational axis 11. The protruding sections 24 are at a maximum distance h from the edge 42 of the receptacles 25 in the peripheral direction around the rotational axis 11. The distance h can be formed by way of example due to manufacturing tolerances. The distance h is advantageously a maximum 2 mm. In this case, the distance h is measured in a plane perpendicular to the rotational axis 11 and tangential to the peripheral direction around the rotational axis 11, in other words perpendicular to an axis which intersects the rotational axis 11 in a perpendicular manner. It is also possible to provide that at least one protruding section 24 rests at least in the peripheral direction around the rotational axis 11 on the edge 42 of the associated receptacle 25 so that the distance h is 0 mm.

As FIG. 9 shows, both the second edge 27 on the base body 12 and also the first edge 22 on the protective hood 10 are formed continuously around the rotational axis 11. In this case, the edges 22 and 27 are not circular but rather asymmetrical. On the side close to the free end 31, the edges 22 and 27 advantageously run approximately in a circular manner around the rotational axis 11. On the side remote from the free end 31, the distance of the edges 22 and 27 from the rotational axis 11 increases uniformly, so that the edges 22 and 27 are approximately egg-shaped in the sectional view. The central axis 44 of the fastening element 14 is at a distance f from the rotational axis 11. The central axis 45 of the fastening element 15 is at a distance g from the rotational axis 11. In the embodiment, the distances f and g are the same and the central axes 44 and 45 are arranged symmetrically with respect to the longitudinal central axis 33 of the outrigger 8 in the illustrated sectional plane perpendicular to the rotational axis 11. The central axis 43 of the fastening element 13 is at a distance e from the rotational axis 11. The distance e is greater than the distances f and g.

The rotation locks 36 and 37 have an angular distance α around the rotational axis 11, which is measured perpendicular to the rotational axis 11 in the sectional plane shown in FIG. 9. The angular distance α is measured in the peripheral direction around the rotational axis 11. The angular distance α is measured in a sectional plane perpendicular to the rotational axis 11 between a straight line which intersects the rotational axis 11 and the central axis 43 of the fastening element 13 and a straight line which intersects the rotational axis 11 and the center axis 44 of the fastening element 14. The rotation locks 37 and 38 have an angular distance β in the peripheral direction around the rotational axis 11. The angular distance β is greater than the angular distance α. The angular distance β is measured in a sectional plane perpendicular to the rotational axis 11 between a straight line which intersects the rotational axis 11 and the central axis 44 of the fastening element 14 and a straight line which intersects the rotational axis 11 and the center axis 45 of the fastening element 15. The rotation locks 38 and 36 have an angular distance γ around the rotational axis 11. The angular distance β is measured in a sectional plane perpendicular to the rotational axis 11 between a straight line which intersects the rotational axis 11 and the central axis 45 of the fastening element 15 and a straight line which intersects the rotational axis 11 and the center axis 43 of the fastening element 13. In the embodiment, the angular distances α and γ are the same. The angular distance β is greater than the angular distances α and γ. The rotation locks 36, 37 and 38 are therefore distributed unevenly over the periphery around the rotational axis 11.

The rotation locks 36, 37 and 38 are arranged in different angular positions around the rotational axis 11. If the longitudinal central axis 33 in the section which extends in FIG. 9 from the rotational axis 11 to the left hand side is taken as a reference, then the first rotation lock 36 is arranged in an angular position of 0°, the second rotation lock 37 is arranged in an angular position which corresponds to the angular distance α and the third rotation lock 38 is arranged in an angular position which corresponds to the sum of the angular distances α and β.

As FIG. 9 also shows, the edges 22 and 27 in the embodiment are at a small distance k from one another. The distance k is advantageously a maximum 2 mm. In an alternative embodiment, it is possible to provide by way of example that the distance k is 0 mm and the edges 22 and 27 abut against each other, advantageously at least in a partial region of their length. The distance k is advantageously approximately in the order of magnitude of the distance h. Due to their asymmetrical configuration around the rotational axis 11, the edges 22 and 27 likewise form a rotation lock for the protective hood 10 with respect to the base body 12 of the outrigger 8. By virtue of the fact that the distances h and k are approximately the same, the edges 27 and 22 and rotation locks 36, 37 and 38 come into contact with each other after approximately the same slight relative rotation of the protective cover and base body 12 so that all the rotation locks jointly prevent a rotation of the protective hood 10 relative to the base body 12. The rotation locks 36 to 38 and the edges 22 and 27 secure the protective hood 10 against a rotation of the protective hood 10 with respect to the outrigger 8 in the rotational direction 26 and in the opposite rotational direction 34 illustrated in FIG. 1. As a consequence, the rotation locks 36 to 38 prevent the protective hood 10 from rotating both in the rotational direction 26 of the tool 9 and also in the counter rotational direction 34.

The rotation locks 36 to 38 secure the protective hood 10 in a positive-locking manner against rotation around the rotational axis 11 in both rotational directions 26 and 34 with respect to the base body 12.

In the embodiment, the protective hood 10 has the protruding section 24 and the receptacle 25 is formed in the outrigger 8. In an alternative embodiment, it is possible to provide that the receptacle 25 is formed on the protective hood 10 and the protruding section 24 is formed on the outrigger 8. The protruding section 24 and the receptacle 25 are advantageously configured as one piece and integrally with the protective hood 10 and the outrigger 8 so that no additional components are required for the rotation locks 36, 37 and 38. The edges 22 and 27 are advantageously formed integrally with the base body 12 of the outrigger 8 and integrally with the protective hood 10.

The FIGS. 10 to 15 show a further embodiment of the outrigger and the protective hood of a work apparatus.

Identical reference characters identify mutually corresponding elements in all the embodiments. Advantageously, elements that are not described in detail in the embodiment according to FIGS. 10 to 15 are configured as in the preceding embodiment, so that reference is made to the description of this embodiment.

Figure 10:
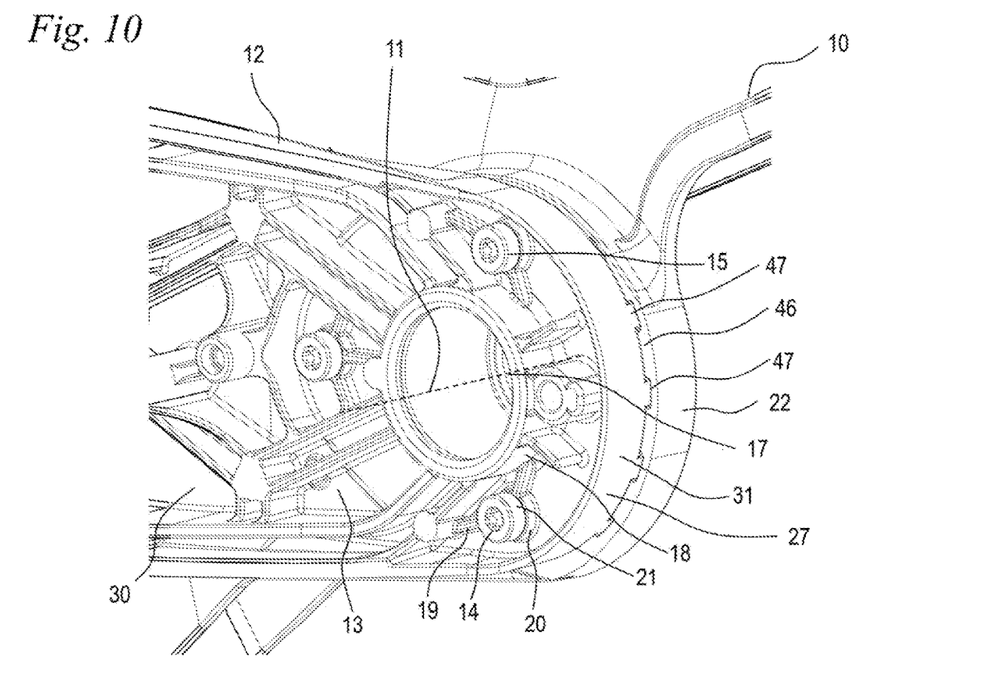
FIG. 10 shows a perspective view of a base body of an outrigger of a further embodiment of a work apparatus with a protective hood arranged thereon.
Figure 11:
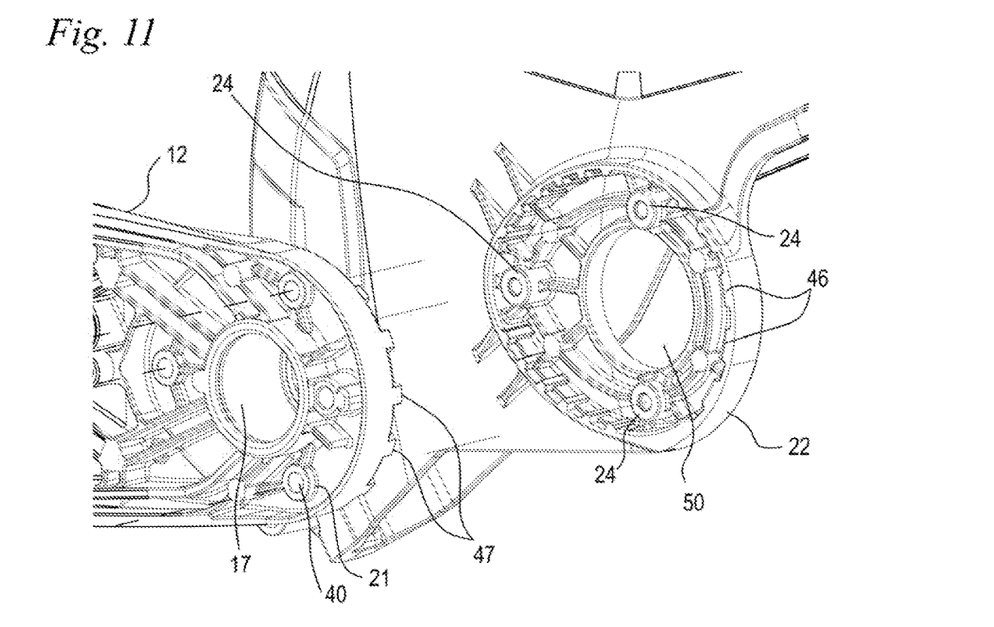
FIG. 11 shows an exploded view of a section of the arrangement shown in FIG. 10.

As FIGS. 10 and 11 show, the first edge 22 has elevations 46 that protrude in the direction towards the rotational axis 11. The second edge 27 has elevations 47 which protrude away from the rotational axis 11. The elevations 46 and 47 engage with one another and act as an additional rotation lock around the rotational axis 11. In the embodiment, the elevations 46 and the elevations 47 are configured as teeth. However, a different configuration of the elevations 46 and/or 47 is also advantageously possible.

Figure 12:
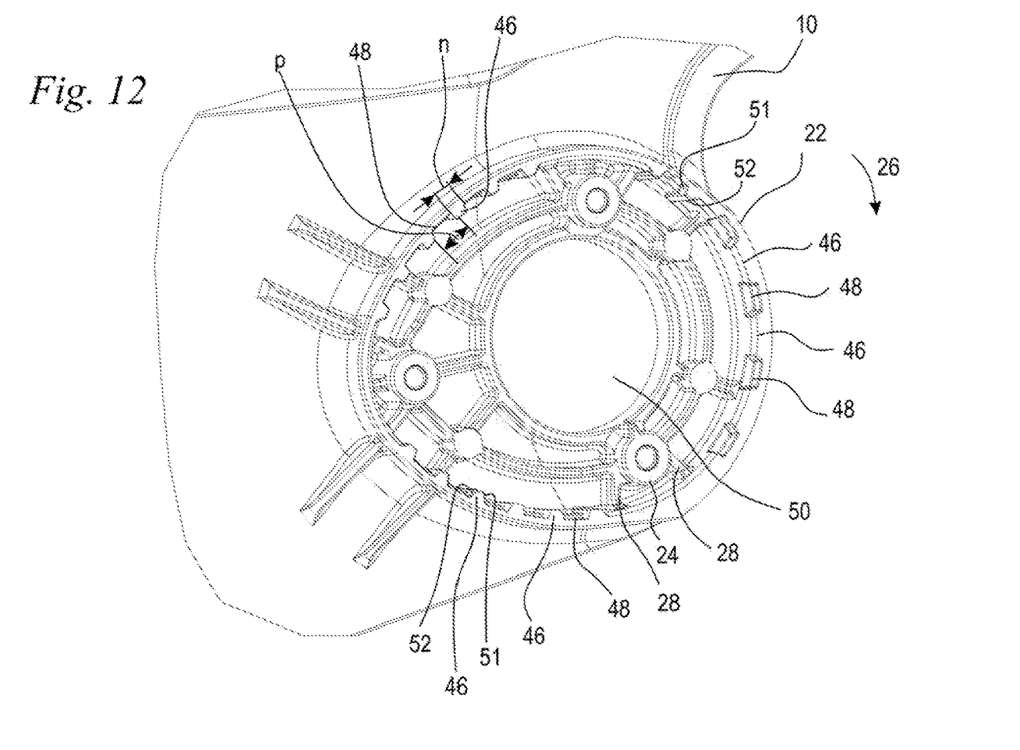
FIG. 12 shows a perspective view of a section of the protective hood from the side facing the outrigger.

FIG. 12 shows the configuration of the first edge 22 of the protective hood 10 in detail. Depressions 48 are formed between elevations 46 that are adjacent in the peripheral direction. In the embodiment, elevations 46 and depressions 48 are arranged in an alternating manner over a large part of the peripheral length of the first edge 22. In the embodiment, no elevations 46 are provided in the areas of the first edge 22 that are arranged radially outside the protruding sections 24. In the embodiment, these areas are adjacent to the edges 42 that run around the receptacles 25 on the outrigger 8 which are illustrated in FIG. 13.

The length n measured along the first edge 22 of an elevation 46 is advantageously 0.5 times to 2 times a length p measured along the first edge 22 of an adjacent depression 48.

As FIG. 12 shows, each elevation 46 has a first side wall 51 and a second side wall 52 which delimit the elevation 46 and the adjacent depressions 48.

Figure 13:
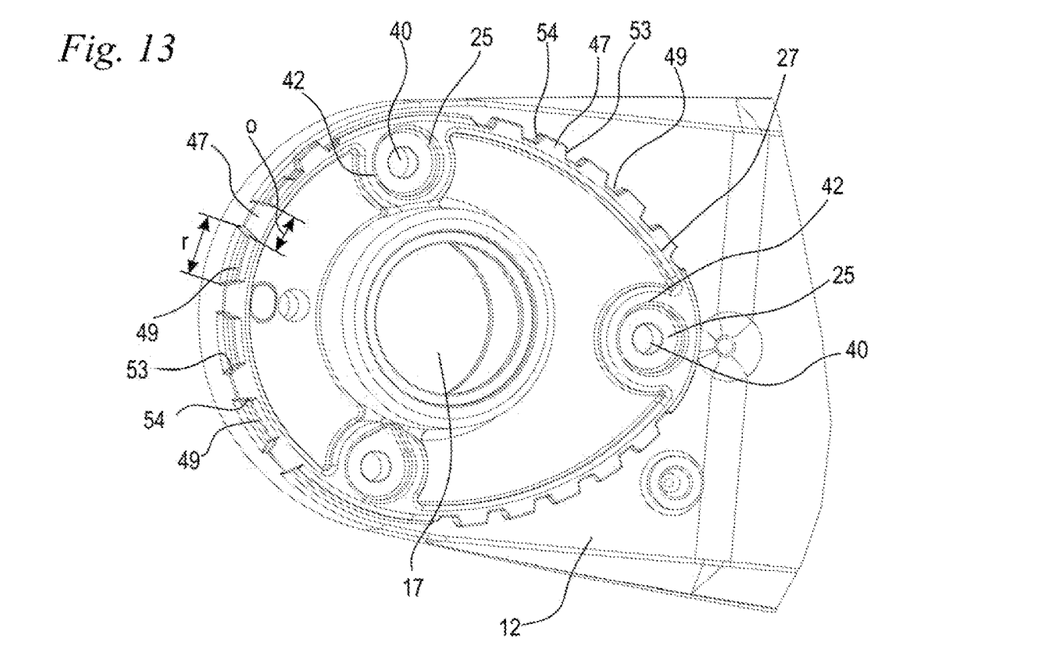
FIG. 13 shows a perspective view of the area of the free end of the outrigger shown in FIG. 10 from the side facing the protection hood.

FIG. 13 shows the configuration of the second edge 27 of the base body 12 of the outrigger 8 in detail. Depressions 49 are formed between elevations 47 that are adjacent in the peripheral direction. In the embodiment, elevations 47 and depressions 49 are arranged in an alternating manner over a large part of the peripheral length of the second edge 27. In the embodiment, no elevations 47 are arranged in the area of the receptacles 25.

The length o measured along the second edge 27 of an elevation 47 is advantageously 0.5 times to 2 times a length r measured along the second edge 27 of an adjacent depression 49.

As FIG. 13 shows, each elevation 47 has a first side wall 53 and a second side wall 54 which delimit the elevation 47 and the adjacent depressions 49.

Figure 14:
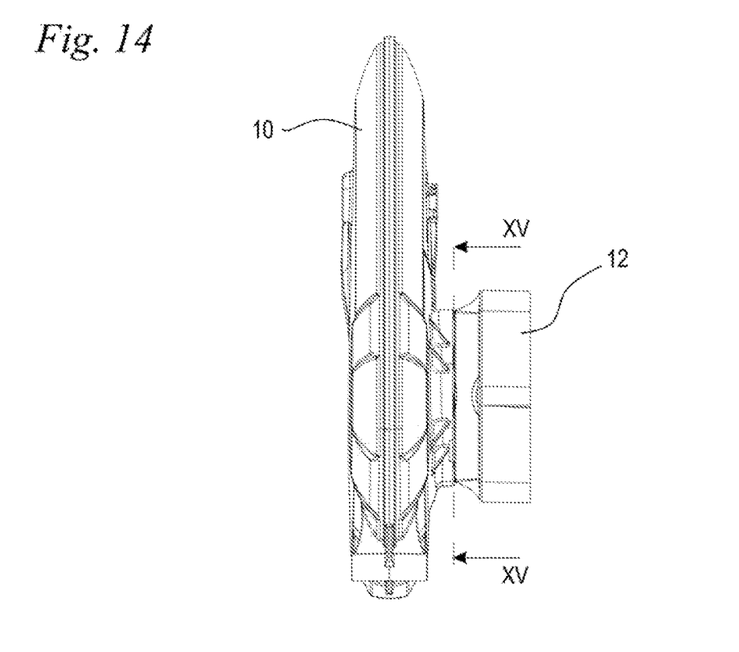
FIG. 14 shows a side view of the arrangement shown in FIG. 10.
Figure 15:
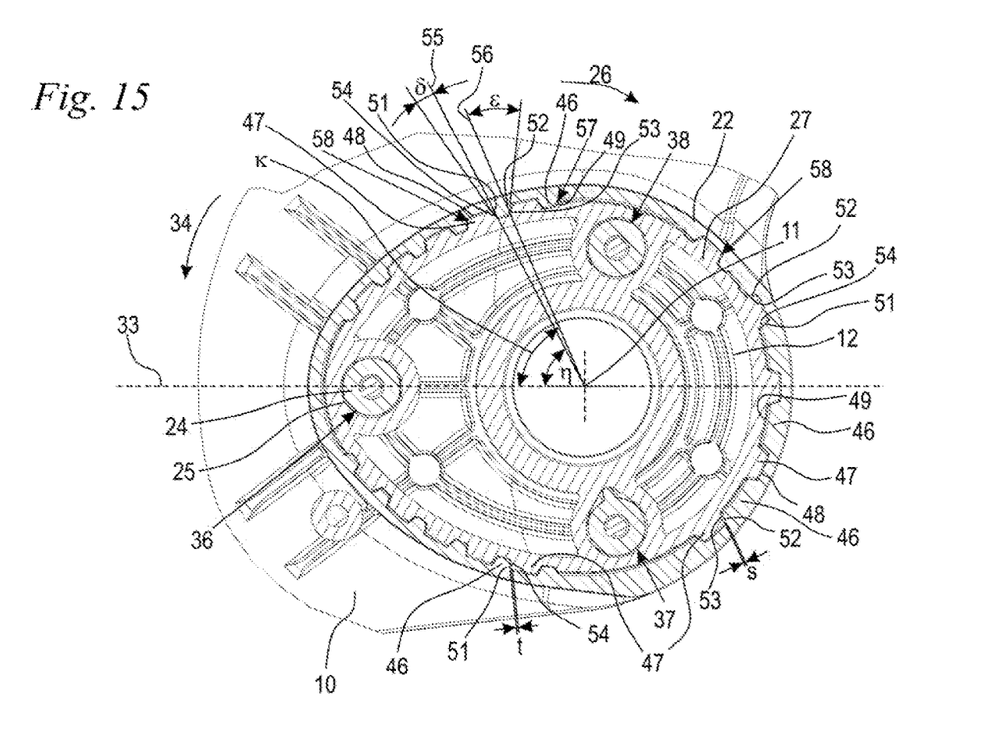
FIG. 15 shows a section along the line XV-XV shown in FIG. 14.

FIG. 14 shows the position of the section through the edges 22 and 27 illustrated in FIG. 15. As FIG. 15 shows, the first edge 22 engages over the second edge 27 on its outer periphery. In this case, the elevations 46 on the first edge 22 engage in the depressions 49 on the second edge 27. The elevations 47 on the second edge 27 engage in the depressions 48 on the first edge 22. The elevations 46, 47 and depressions 48, 49 form a meshing arrangement between the edges 22 and 27. As a consequence, the torques that can be supported around the rotational axis 11 by way of the edges 22 and 27 can be easily increased compared to the configuration in the previous embodiment.

The side walls 51 and 54 of the elevations 46 and 47 are adjacent to each other. The side walls 51 and 54 of the elevations 46 and 47 are advantageously adjacent to each other or are at a distance t of less than 2 mm from each other. Within the manufacturing tolerances, the side walls 51 and 54 prevent the protective hood 10 from rotating in the rotational direction 34.

The side walls 52 and 53 of the elevations 46 and 47 are adjacent to each other. The side walls 52 and 53 of the elevations 46 and 47 are advantageously adjacent to each other or are at a distance s of less than 2 mm from each other. Within the manufacturing tolerances, the side walls 52 and 53 prevent the protective hood 10 from rotating with respect to the base body 12 in the rotational direction 26.

Each elevation 46 together with the associated depression 49 forms a rotation lock 57. Within the manufacturing tolerances, each rotation lock 57 that is formed by an elevation 46 and an associated depression 49 prevents the protective hood 10 from moving around the rotational axis 11.

Each elevation 47 together with the associated depression 48 forms a rotation lock 58. Within the manufacturing tolerances, each rotation lock 58 that is formed by an elevation 47 and an associated depression 48 prevents the protective hood 10 from moving around the rotational axis 11.

Each rotation lock 57 and each rotation lock 58 secures the protective hood 10 in a positive-locking manner against rotation around the rotational axis 11 so that the protective hood 10 is prevented from moving with respect to the base body 12 of the outrigger 8 around the rotational axis 11. By preventing the movement of the protective hood 10 with respect to the base body 12 around the rotational axis 11, it means in the present case that the protective hood 10 can be rotated over an angle of less than 5°, in particular less than 3° and it is prevented from rotating over a larger angle in both rotational directions 26 and 34 by each rotation lock 57 and 58.

As FIG. 15 shows, the side walls 52 and 53 in the illustrated section are inclined perpendicular to the rotational axis 11 with respect to a radial 56 to the rotational axis 11 by an angle ε which is less than 90°. Advantageously, the angle ε for at least one side wall 52 or 53, preferably for all side walls 52 and 53, is less than 45°, in particular less than 30°.

The side walls 51 and 54 in the illustrated section are inclined perpendicular to the rotational axis 11 with respect to a radial 55 to the rotational axis 11 by an angle δ which is less than 90°. Advantageously, the angle δ for at least one side wall 51 or 54, preferably for all side walls 51 and 54, is less than 45°, in particular less than 30°.

As FIG. 15 also shows, the radial 55 that indicates the position of the rotation lock 57 that is formed by the side walls 51 and 54 includes an angle η with the region of the longitudinal center line 33 that extends to the left hand side of the rotational axis 11 in the illustration in FIG. 15. The radial 56, which indicates the position of the rotation lock 58 that is formed by the side walls 52 and 53, includes with the region of the longitudinal center line 33 that extends to the left hand side of the rotational axis 11 in the illustration in FIG. 15 an angle κ which is greater than the angle η. The rotation locks 57 and 58 are arranged accordingly in different angular positions around the rotational axis 11. Advantageously, all rotation locks 57 and 58, which are formed by co-operating side walls 51 and 54 or by co-operating side walls 52 and 53, are arranged in different angular positions around the rotational axis 11.

It may be provided that the angle ε or the angle δ for one or more side walls 51, 52, 53 and/or 54 is 0°. In the embodiment, the side walls 51, 52 of an elevation 46 and the side walls 53, 54 of an elevation 47 are each inclined in the opposite direction with respect to the radials 55 and 56, respectively, with the result that a widened base area of the elevations 46 and 47 and a good dissipation of forces which are introduced by the elevations 46 of the protective hood 10 into the elevations 47 of the base body 12 is produced.

A further embodiment for a work apparatus 1 is produced if the work apparatus 1 has only rotation locks 57 and 58 and does not have rotation locks 36, 37 and 38.

It is understood that the foregoing description is that of the preferred embodiments of the invention and that various changes and modifications may be made thereto without departing from the spirit and scope of the invention as defined in the appended claims.

The invention claimed is:

1. A work apparatus comprising:
a tool configured to be driven in a rotating manner around a rotational axis;
a protective hood extending over at least a part of a periphery of said tool;
said protective hood being attached to a housing part of the work apparatus;
at least two rotation locks for said protective hood which are arranged in different angular positions around said rotational axis and prevent said protective hood from moving with respect to said housing part around said rotational axis;
a first one of said protective hood and said housing part being a first component;
a second one of said protective hood and said housing part being a second component,
wherein said first component differs from said second component; and,
each of said at least two rotation locks being configured such that said first component has a protruding section which cooperates with a section of said second component and secures said protective hood on said housing part in a positive-locking manner against rotation around said rotational axis, so that said protective hood is prevented from moving with respect to said housing part around said rotational axis.

2. The work apparatus of claim 1, wherein said protective hood is attached to said housing part of the work apparatus via at least one fastening element.

3. The work apparatus of claim 2, wherein, to provide the positive-locking security against rotation around said rotational axis, said protruding section engages in a receptacle of the second component of said protective hood and said housing part and said at least one fastening element protrudes into said protruding section.

4. The work apparatus of claim 2, wherein the first component of said protection hood and said housing part has at least one screw boss which forms said protruding section; and, said at least one fastening element is a fastening screw that is screwed into said screw boss.

5. The work apparatus of claim 1, wherein a first edge is formed on said protective hood and a second edge is formed on said housing part; and, said first edge and said second edge engage with each other and thereby secure said protective hood on said housing part in the positive-locking manner against rotation around said rotational axis.

6. The work apparatus of claim 5, wherein at least one of said first edge and said second edge is non-circular.

7. The work apparatus of claim 5, wherein at least one of said first edge and said second edge runs around said rotational axis.

8. The work apparatus of claim 5, wherein a maximum distance of 2 mm is formed between said first edge and said second edge; and, said maximum distance is measured perpendicular to said rotational axis.

9. The work apparatus of claim 5, wherein said first edge engages over said second edge.

10. The work apparatus of claim 1, wherein said protruding section is arranged on said protective hood.

11. The work apparatus of claim 1, wherein a plurality of protruding sections are provided which are interconnected via a plurality of ribs.

12. The work apparatus of claim 1, wherein the work apparatus is a cut-off machine having a drive motor and said housing part, to which said protective hood is attached, is an outrigger of the cut-off machine.

13. The work apparatus of claim 1, wherein at least three of said rotation locks are provided and an angular distance between two of said at least three rotation locks that are adjacent in a peripheral direction around the rotational axis is not equal for all adjacent ones of said at least three rotation locks.

14. A work apparatus comprising:
a tool configured to be driven in a rotating manner around a rotational axis;
a protective hood extending over at least a part of a periphery of said tool;
said protective hood being attached to a housing part of the work apparatus;
at least two rotation locks for said protective hood which are arranged in different angular positions around said rotational axis;
a first one of said protective hood and said housing part being a first component;
a second one of said protective hood and said housing part being a second component,
wherein said first component differs from said second component;
said first component having a protruding section which cooperates with a section of said second component and secures said protective hood on said housing part in a positive-locking manner against rotation around said rotational axis, so that said protective hood is prevented from moving with respect to said housing part around said rotational axis;
wherein a first edge is formed on said protective hood and a second edge is formed on said housing part; and, said first edge and said second edge engage with each other and thereby secure said protective hood on said housing part in the positive-locking manner against rotation around said rotational axis; and,
wherein at least one protruding section is formed by an elevation on one of said first edge and said second edge and engages in a depression of the other of said first edge and said second edge and forms therewith at least one rotation lock.

15. A work apparatus comprising:
a tool configured to be driven in a rotating manner around a rotational axis;
a protective hood extending over at least a part of a periphery of said tool;
said protective hood being attached to a housing part of the work apparatus;
at least two rotation locks for said protective hood which are arranged in different angular positions around said rotational axis;
a first one of said protective hood and said housing part being a first component;
a second one of said protective hood and said housing part being a second component,
wherein said first component differs from said second component;

said first component having a protruding section which cooperates with a section of said second component and secures said protective hood on said housing part in a positive-locking manner against rotation around said rotational axis, so that said protective hood is prevented from moving with respect to said housing part around said rotational axis;

wherein said protective hood is attached to said housing part via at least one first fastening element and at least one second fastening element; and, said at least one first fastening element and said at least one second fastening element are at different distances from said rotational axis.

\* \* \* \* \*